Nov. 18, 1969 U. F. GIANOLA 3,479,660

PARALLEL ADDRESS MAGNETIC DOMAIN WALL MEMORY

Filed Dec. 14, 1966 3 Sheets-Sheet 1

INVENTOR
U. F. GIANOLA
BY Herbert M. Shapiro
ATTORNEY

United States Patent Office 3,479,660

Patented Nov. 18, 1969

3,479,660
PARALLEL ADDRESS MAGNETIC DOMAIN WALL MEMORY

Umberto F. Gianola, Florham Park, N.J., assignor to Bell Telephone Laboratories, Incorporated, Murray Hill and Berkeley Heights, N.J., a corporation of New York Filed Dec. 14, 1966, Ser. No. 601,692
Int. Cl. G11b 5/74
U.S. Cl. 340—174 7 Claims This invention relates to magnetic memory circuits and, more particularly, to such circuits which permit addressing by content rather than by location.

Content addressable memories, in general, are intended to reduce accessing time for information retrieval in special purpose mass memories or to ease the program complexities for the readout of memories in data processing systems. The problem is that content addressing requires a certain amount of logic for each word in memory and that that logic is sufficiently expensive in most implementations to make the resulting memory noncompetitive with, say, a corresponding random access memory.

Accordingly, an object of this invention is a magnetic memory in which the capability of content addressing is provided in a simple and inexpensive manner.

The invention is based on an adaptation of domain wall memories of the type described in copending application Ser. No. 579,902, filed Sept. 16, 1966, for H. E. D. Scovil, and provides, in one aspect, an improved readout for that memory.

Accordingly, another object of this invention is a new and novel domain wall memory.

The foregoing and further objects of this invention are realized in one embodiment thereof wherein a binary zero or a binary one is stored in each multiposition bit location of a domain wall memory as a domain wall in a zero or a one position, respectively. The bit locations are defined in domain wall wires and organized in words. All domain walls in one positions are advanced synchronously along extensions of the wires in which the bit locations are defined. A plurality of sense conductors, each coupled to successively offset positions along the extensions of those wires in which corresponding bits of different words are being advanced, detect the bits of a word in parallel. Accordingly, parallel indications of the bits of each word in memory appear sequentially in the sense conductors for matching with a stored match word. Each match detected may be employed to gate the corresponding word address from an address generator into a utilization circuit for control of a later interrogation of the memory. In this manner, an indication of each binary one in memory is provided merely by moving the walls representing these indications controllably. The arrangement of sense conductors organizes the presence and absence of moving walls into meaningful indications of stored binary words for comparison.

Accordingly, a feature of this invention is a magnetic memory comprising a magnetic medium wherein information is stored as a domain wall in zero or one positions in each bit location, including means synchronously advancing walls in one positions in a direction illustratively away from corresponding zero positions.

Figure 1:
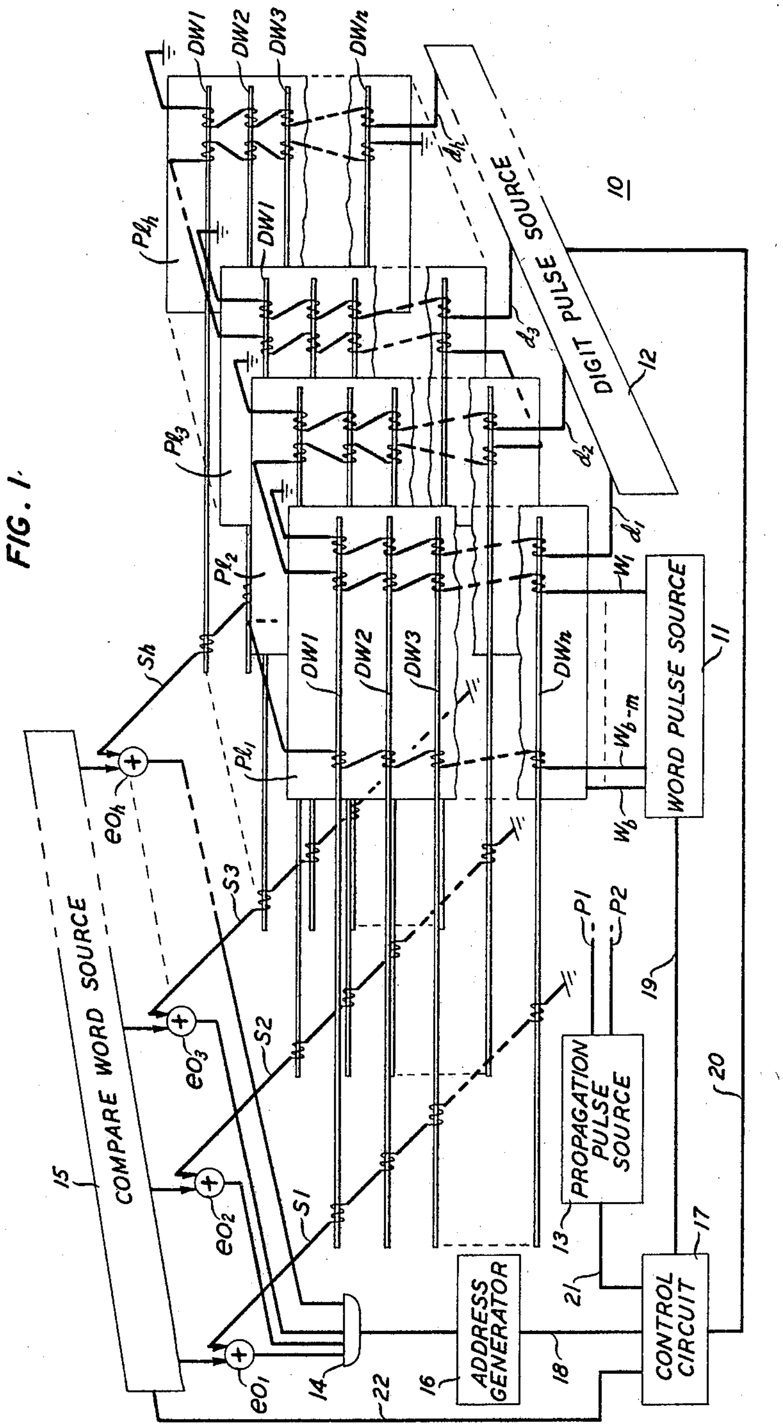
Figure 2:
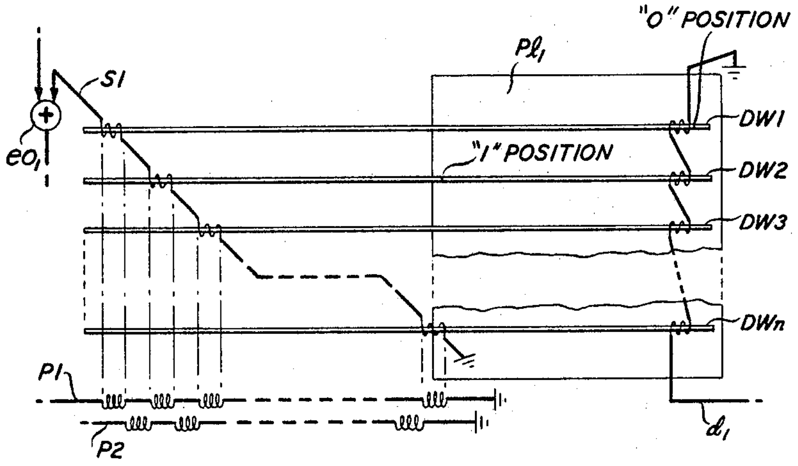
Figure 3:
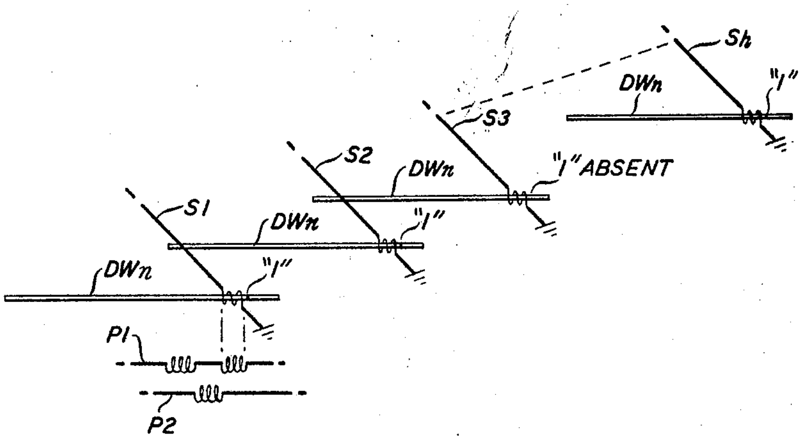
Figure 4:
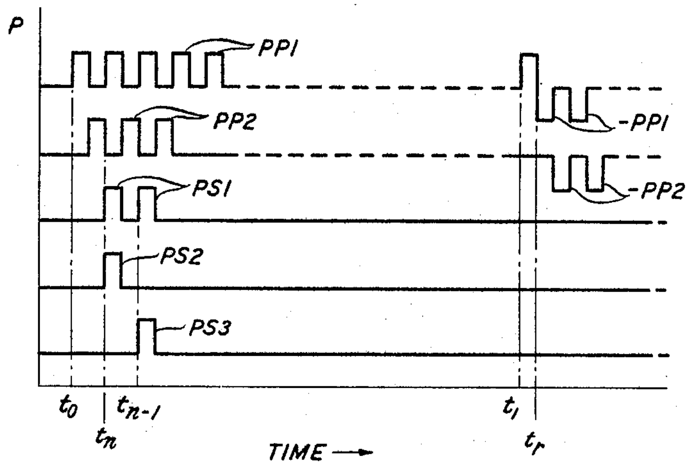
Figure 5:
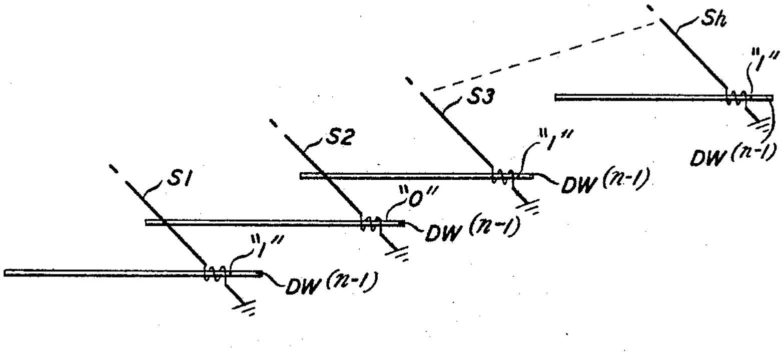

The foregoing and further objects and features of this invention will be understood more fully from the following detailed discussion rendered in conjunction with the accompanying drawing in which:

FIG. 1 is a schematic representation of a magnetic memory in accordance with this invention;

FIGS. 2, 3, and 5 are schematic representations of portions of the memory of FIG. 1; and FIG. 4 is a pulse diagram of the operation of the memory of FIG. 1.

FIG. 1 shows a magnetic memory 10 in accordance with this invention. The memory is shown as a plurality of memory planes $Pl_1$, $Pl_2$, $Pl_3$ . . . $Pl_h$, each including a plurality of domain wall wires DW1, DW2, DW3, . . . , and DW*n*. Each memory plane is identified by a box symbol identified by the plane designation. The wires within a single box symbol provide storage locations for corresponding bits of different words in memory. Thus plane $Pl_1$ is a bit plane for the first bits in each word in memory, the corresponding wires, viz wire DW1, in each bit plane providing the sites for the storage of a binary word.

The above-mentioned copending application of H. E. D. Scovil discloses a domain wall wire memory in which information is stored as a domain wall in a zero or a one position in each bit location. The portions of the memory within each box symbol in FIG. 1 comprise such a memory. Information is stored in each wire to the extreme right or to the left, where the left vertical edge of the box symbol intersects the wires, as viewed in FIG. 1. The positions are shown most clearly in FIG. 2 where they are identified as zero (0) and one (1) positions, respectively, for wires DW1 and DW2. The domain wall wires in each plane, however, extend to the left beyond the corresponding box symbol as shown in FIG. 1.

The operation of such a memory provides domain walls at zero or one positions controllably in each bit location in a manner disclosed in the aforementioned copending application and to be described briefly hereinafter. What is to be appreciated at this juncture in the disclosure is that the box symbols of FIG. 1 represent a word-organized memory and that the domain wall wires defining bit locations in those box symbols are extended beyond what is normally thought of as the word-organized memory. A recitation of the structure of the memory of FIG. 1 is more meaningful in this context.

A plurality of conductors $W_1$ . . . $W_{b-m}$ . . . $W_b$ couple, in like senses, corresponding portions of the corresponding wire in each plane of FIG. 1. In addition, conductors $W_1$ . . . $W_{b-m}$ . . . $W_b$ couple all the wires in each plane in a coded manner such that in response to a sequence of pulses of a first polarity applied to consecutive conductors from right to left, as viewed in FIG. 1, a domain wall in a zero position moves to the corresponding one position in only a selected location in each plane. For example, a code corresponding to the selection of wires DW2 moves a wall in each wire DW2 from a zero to a one position when enabled by digit pulses as will become clear. Next adjacent couplings of such conductors along a given domain wall wire overlap one another conveniently to provide the described movement but are shown spaced apart for clarity. Conductor $W_1$ is shown coupled to all the domain wall wires in FIG. 1, in a suitable manner. Conductor $W_{b-m}$ is shown coupled only to the wires of plane $Pl_1$. Illustratively, the couplings are coded in a binary fashion. Conductors $W_1$ . . . $W_{b-m}$ . . . $W_b$ are connected between a word pulse source 11 and ground. Pulses applied by source 11, then, operate to move (advance) a domain wall from a zero to a one position in a selected wire in each memory plane.

Digit conductors $d_1$, $d_2$, . . . , and $d_h$ couple the domain wall wires of corresponding memory planes. The position of the couplings between the digit conductors and the wires is just to the left of the zero position as viewed in FIGS. 1 and 2. Each digit conductor is connected between a digit pulse source 12 and ground. A pulse on a digit conductor operates to move a wall in a zero position into a position to be influenced by the coded (word) advance pulses.

In planes where such a digit pulse is absent, the coded advance fields do not advance the domain wall. In this manner, digit and word pulses cooperate to provide, selectively, domain walls at one positions as shown in FIGS. 1 and 2. For example, a binary word 101 . . . 1 is stored in the word location defined by wires DW2 by energizing digit conductors $d_1$, $d_3$, . . . $d_h$ and by selecting the code for wires DW2 on word conductors W. The operation is entirely consistent with that disclosed in the aforementioned copending application and is not discussed further herein. It is sufficient to assume that information is represented as the presence and absence of domain walls at one positions as shown in FIG. 2 and that the aforementioned application describes one implementation for so providing such a disposition of walls. Alternatives are available.

Propagation conductors P1 and P2 couple the extensions of all the wires DW in FIG. 1. The couplings of conductors P1 and P2 illustratively alternate along each of the extensions to provide step-along fields for advancing a single wall in a manner well understood in the art. The actual manner of coupling is illustrated by the coil configuration designated P1 and P2 in FIG. 2; such coils are to be understood to couple each wire in memory. Conveniently, couplings are provided by serpentine printed circuit strap solenoids common to whole arrays of domain wall wires. Conductors P1 and P2 are connected between propagation pulse source 13 and ground as indicated in FIGS. 1 and 2.

The propagation conductors operate to advance a domain wall what may be thought of as one position to the left each time source 12 applies a pulse first to a P1 conductor and then to a P2 conductor. The extensions of the domain wall wires, then, may be thought of as composed of $n$ consecutive positions for domain walls.

Sense conductors S1, . . . , and S$h$ couple the extensions of the wires in correspondingly designated planes in successively offset positions. Visualize, for example, sense conductor S1 coupled to the extensions of the wires in plane $Pl_1$ at the $n$th position along the extension of wire DW1, at the $n-1$th position along the extension of wire DW2, etc., and the first position along the extension of wire DW$n$. Thus, as source 12 applies pulses to conductors P1 and P2 all walls at one positions advance to the left. Any walls in wires DW$n$ induce pulses in corresponding sense conductors during the first alternation of P1–P2 pulses. All walls in, say, the DW3 wires similarly induce pulses in corresponding sense conductors during the $n$—3d alternation. In $n$ alternations, all words in memory are represented sequentially as coded pulses in the sense conductors.

The sense conductors are connected between inputs to correspondingly referenced exclusive-OR circuits $eo_1$, $eo_2$, . . . $eo_h$ and ground. Another input to each of exclusive-OR circuits is connected to an output of a compare word source 15. The output of each exclusive-OR circuit $eo$ is connected to an input of an AND circuit 14. For each compare word sought in memory, source 15 provides inputs to exclusive-OR circuits $eo$ in a coded manner. The propagation pulses cause walls to move for generating coded pulses representing stored information in sense conductors S. When the correctly coded pulses appear in the sense conductors, AND circuit 14 is activated. It will become clear in the examples of the operation which follow that the code provided by source 15 is the complement of the code desired in the sense conductors for the illustrative arrangements.

The output of AND circuit 14 is connected to an address generator 16, i.e., a simple counter, which sequentially generates the addresses of the words in memory. A match between the compare word and a word in memory may, for example, gate the corresponding address into a suitable store which is assumed included within control circuit 17 to which address generator 16 is connected by a representative conductor 18. The gating of address information to a store in a suitable manner is well understood in the art and in no need of further elaboration herein. Alternatively, a match between the compare word and a word in memory may be employed, in a like manner, to gate out the corresponding word from memory directly into a suitable utilization circuit (not shown) connected to the exclusive-OR circuits $eo$ and under the control of control circuit 17.

Sources 11, 12, 13, and 15 are connected to control circuit 17 via conductors 19, 20, 21, and 22, respectively. The various sources and circuits may be any such elements capable of operating in accordance with this invention.

Let us assume that information is stored in the memory in a manner consistent with that disclosed in the aforementioned copending application. Also assume that an illustrative word 110 . . . 1 is stored in the word location $n$ defined by all the domain wall wires $DW_n$. The presence and absence of walls at the one positions in word location $n$ is shown in FIG. 3 where a wall is represented as a vertical line. Note that a wall is absent in the third wire from the bottom as viewed in the figure. A propagation pulse on each of conductors P1 and P2, then, advances all the walls in one positions to the left. For a stored 110 . . . 1, pulses are generated in sense conductors S1, S2 and S$h$ but not in sense conductor S3. If pulses are provided for the exclusive-OR circuits in the pattern—not $eo_1$, not $eo_2$, $eo_3$, . . . and not $eo_h$ by compare word source 15, a match is detected and AND circuit 14 provides an output which causes the corresponding address to be stored (or, alternatively, read out). It is to be emphasized that the compare source 15 provides an input to an exclusive-OR circuit where no input is forthcoming from a match word in memory and thus provides the complement of the desired word.

The walls in wires $DW_n$ continue to advance in response to next consecutive P1 and P2 pulses. However, the walls do not again meet a sense conductor coupling and thus provide no additional coded outputs. Since all walls in one positions (in all wires) advance in response to the propagation pulses, the second set of P1 and P2 pulses advance walls in wires $DW^{(n-1)}$ past corresponding sense couplings inducing pulses therein corresponding to the word stored in those wires. After $n$ sets of propagation pulses, all words in memory are read out and the walls are stepped to the right as shown in FIG. 1, returning walls to the corresponding one positions as will be described hereinafter. If the memory contains $n$ words, $2n$ propagation pulses are required, illustratively, to read the entire memory providing the addresses of match words. The sense conductor couplings, of courses, could be arranged to provide an indication of a word for each propagation pulse in which case only $n$ propagation pulses are needed to so read the entire memory.

Normally, a match is desired between a compare word and the first few "tag" bits of words stored in memory as is well known. Consider the operation when a match word 101 . . . is sought after. Only exclusive-OR circuit $eo_2$ is pulsed by source 15. Accordingly, each word in memory having a binary one stored in its bit locations in planes $Pl_1$ and $Pl_3$ provides pulses in sense conductors S1 and S3 for pulsing exclusive-OR circuits $eo_1$ and $eo_2$ enabling their addresses to be stored for later interrogation.

Let us see how this works in detail. FIG. 4 shows a pulse diagram of the operation which is useful to this end. Any word in memory having the first three tag bits 101 provides a match. FIG. 3 shows a non-match word stored in wires DW$n$ in the memory of FIG. 1. At time $t_0$ in FIG. 4, propagation pulses $pp1$ and $pp2$ are initiated in conductors P1 and P2, respectively. All ones (walls at one position) in memory move to the left. At a time designated $t_n$, all walls indicative of binary ones in the $n$th word of the memory induce pulses in sense conductors S as discussed in connection with FIG. 3. The tag bits of that word are 110, however. Source 15 provides pulsed inputs to exclusive-OR circuit $eo_2$ but not to exclusive-OR circuits $eo_1$ and $eo_3$. A stored 110 . . .

corresponds to pulses PS1 and PS2 on conductors S1 and S2 of FIG. 3. Thus, exclusive-OR circuits $eo_2$ and $eo_3$ (two inputs and no inputs, respectively) provide no outputs; exclusive-OR circuit $eo_1$ does. In turn, AND circuit 14 provides no input for gating the corresponding address from address generator 16.

It is to be noted in FIG. 2 that the couplings of each sense coil correspond to a position of a P1 coil. Thus, outputs appear illustratively in the sense conductors of FIG. 1 during *pp*1 pulses only. Accordingly, source 15 provides pulsed inputs to exclusive-OR circuit *eo* each time a propagation pulse *pp*1 is applied, under the control of control circuit 17.

FIG. 5 shows a match word stored in the wires $DW^{(n-1)}$ of word $n-1$. Source 15 is still providing (complementary) pulsed inputs only to exclusive-OR circuit $eo_2$. When the *pp*1 pulse is applied at time $n-1$ in FIG. 4, pulses PS1 and PS3 are induced in sense conductors S1 and S3 while no pulse is induced in sense conductor S2. All exclusive-OR circuits $eo_1$, $eo_2$, and $eo_3$ provide outputs. AND circuit 14 is activated and the corresponding address is gated into a store for later interrogation. It is clear that predetermined ones of the inputs to AND circuit 14 may be pulsed at the time pulses are induced in the sense conductors for permitting the (remaining) inputs not so pulsed to define the tag bits of stored words.

On each succeeding pulse *pp*1, a different word is read out in this manner until, at time $t_1$ in FIG. 5, all words in memory are read out and the addresses of all match words are recorded. The time designations in FIG. 4 thus correspond to the word being read out of memory when the corresponding *pp*1 pulse is applied. Thereafter, at time $t_r$ in FIG. 4, all walls representing binary ones are returned to their original (one) positions, conveniently by applying (*n*) negative pulses $-pp\mathbf{1}$ and $-pp\mathbf{2}$ to conductors P1 and P2 under the control of control circuit 17. Media having substantially uniform propagation thresholds may be operated, alternatively, with a drift field rather than with a sequence of propagation pulses. Like results are achieved.

Each of the *n* positions coupled by a sense conductor need be 100 mils or less long. Accordingly, interrogation of the entire memory in accordance with this invention requires only that time necessary to move a domain wall (2)*n* times the length of one coupling. For presently available wire the time for moving a wall the length of one coupling is of the order of a microsecond and, thus, a memory of 1,000 words may be operated to provide the addresses of all match words in about one millisecond. This is to be compared with the aforementioned application which discloses a read operation wherein walls in one positions are selectively returned to zero positions and restored to initial positions for a read operation.

It has been stated hereinbefore that the domain wall memory disclosed in the aforementioned Scovil application is only one compatible word-organized memory. Other memories such as magnetic core memories may be organized in such a fashion to provide the presence and absence of indications in one positions of corresponding propagation channels as shown for domain wall wire devices in FIG. 1. Operation is entirely analogous to that described.

Moreover, each wire in which a bit of a word is located as shown in FIG. 1 may also provide the location for corresponding bits of other words. Illustratively, one wire per bit is shown.

What has been described is considered to be only illustrative of this invention. Accordingly, various and numerous other arrangements in accordance with the principles of this invention may be devised by one skilled in the art without departing from the spirit and scope thereof.

What is claimed is:

1. A combination comprising a plurality of magnetic media, means defining in each of said media a bit location including first and second postions for a domain wall, means selectively moving domain walls from first to second positions in said bit locations, means moving all domain walls in second positions along corresponding magnetic media, sense means coupled to said media in a manner to provide consecutive parallel indications of the presence and absence of moving domain walls in prescribed sets of bit locations, and means returning all so moved domain walls to corresponding second positions.

2. A combination in accordance with claim 1 wherein said magnetic media comprise domain wall wires.

3. A combination in accordance with claim 2 wherein said sense means comprises a plurality of sense conductors each coupled to the wires of a different set of wires at positions therealong consecutively offset from one another.

4. A combination in accordance with claim 3 also including means responsive to each of said parallel indications and to a first coded signal for providing an output pulse when a parallel indication and said first coded signal match.

5. A combination in accordance with claim 4 including means responsive to each of said output pulses for providing the address of the corresponding information.

6. A combination comprising a plurality of magnetic wires, means selectively providing domain walls in first positions in said wires, a plurality of sense conductors each coupled to successively offset positions in the wires of a different set of said wires, means advancing said walls in said wires for providing in said sense conductors parallel indications of the presence and absence of domain walls in corresponding wires of said sets, means comparing parallel indications to a prescribed binary word for providing addresses of those indications which match said binary word, and means restoring said walls to first positions.

7. A magnetic memory comprising a plurality of domain wall wires arranged in planes, means including a plurality of first conductors coupled alike to corresponding ones of said wires of said planes, said first conductors being coupled to the wires of each plane in a coded manner such that a sequence of pulses applied to said first conductors advances a domain wall only in a selected wire in each of said planes from first to second positions therein, means including conductors coupled to each of said wires for moving all walls in second positions along corresponding wires, means comprising a plurality of sense conductors each coupled to the wires of one of said planes at consecutively offset positions therealong, said sense conductors providing consecutive parallel indications of the presence and absence of moving domain walls in said corresponding wires, means responsive to each of said consecutive parallel indications and to a first coded signal for providing an indication when a parallel indication and said first coded signal match, and means returning all so moved walls to corresponding second positions.

References Cited

UNITED STATES PATENTS 340,384 10/1969 Snyder ------------- 340—174

BERNARD KONICK, Primary Examiner

STEVEN B. POKOTILOW, Assistant Examiner